United States Patent [19]

Habicht

[11] Patent Number: 4,545,281

[45] Date of Patent: Oct. 8, 1985

[54] DEVICE FOR STRING INSTRUMENTS FOR ADJUSTING CHORDS

[76] Inventor: Volker E. Habicht, Nordendstr. 29, D-8080 Emmering, Fed. Rep. of Germany

[21] Appl. No.: 568,225

[22] PCT Filed: Mar. 28, 1983

[86] PCT No.: PCT/EP83/00091

§ 371 Date: Dec. 1, 1983

§ 102(e) Date: Dec. 1, 1983

[87] PCT Pub. No.: WO83/03493

PCT Pub. Date: Oct. 13, 1983

[30] Foreign Application Priority Data

Apr. 1, 1982 [DE] Fed. Rep. of Germany ....... 3212168
May 25, 1982 [DE] Fed. Rep. of Germany ....... 3219590

[51] Int. Cl.[4] ........................ G09B 15/02; G10D 3/00

[52] U.S. Cl. ........................................ 84/315; 84/317; 84/318; 84/478

[58] Field of Search ...................... 84/1.01, 1.16, 1.24, 84/317, DIG. 22, DIG. 30, 315, 318, 477 R, 478

[56] References Cited

U.S. PATENT DOCUMENTS

| | | | |
|---|---|---|---|
| 2,906,158 | 9/1959 | McBride | 84/315 |
| 3,433,112 | 3/1969 | Bradt | 84/317 |
| 3,837,255 | 9/1974 | Starnes et al. | 84/317 |
| 3,851,558 | 12/1974 | Hopkins | 84/317 |
| 4,061,069 | 12/1977 | Brackett | 84/315 |
| 4,204,454 | 5/1980 | Severn | 84/315 |
| 4,228,718 | 10/1980 | Smith | 84/317 |
| 4,295,402 | 10/1981 | Deutsch et al. | 84/1.16 X |
| 4,343,218 | 8/1982 | Futamase | 84/1.01 X |
| 4,388,851 | 6/1983 | Hoskinson et al. | 84/1.24 |

FOREIGN PATENT DOCUMENTS 8200396 4/1982 Netherlands .

*Primary Examiner*—Stanley J. Witkowski
*Attorney, Agent, or Firm*—Dennison, Meserole, Pollack & Scheiner

[57] ABSTRACT

A device for adjusting chords in string instruments wherein elements for effectively shortening the musical length of a string are disposed on the instrument for taking over the former function of the fingering hand for the use in playing chords or tones. The desired chords are electrically stored and are read back by operating elements from programmable and exchangeable memories by pulses to the corresponding string shortening elements so that the pitch of the strings is changed and by this the desired chord is adjusted on the instrument. The operating elements make the selection of chords and their variations possible and the chord sequences can be adjusted by actuating a simple push button. A display is provided to facilitate the selection by the musician from the various programs and to give an understanding as to which chord has been selected. Means are also provided for dampening the strings so that rhythm effects can be obtained.

10 Claims, 9 Drawing Figures

DEVICE FOR STRING INSTRUMENTS FOR ADJUSTING CHORDS

The present invention relates to a device having shortening elements for string instruments, in particular guitars, lutes, banjos, mandolins, or the like. The device comprising shortening elements serves to adjust chords or tones by means of control elements for shortening of the strings. Devices of this sort are known and serve to make playing the aforementioned string instruments either easier or possible.

Chords, chord series or single tones on said string instruments are produced e.g. on the guitar by four fingers and, if necessary, the thumb of the so-called stopping hand, by shortening the strings which are being played by the playing hand. Many chords, e.g. on the six strings of the guitar, cannot be fingered or can be fingered only inadequately because the four stopping fingers and occasionally the thumb are not able to correctly finger all the chords possible.

This demonstrates that even for trained players there is a considerable difference between the playing possibilities of the instrument and the playing capacity. This difference is particularly burdensome for the beginner.

This is why various attempts have been made to ease the fingering of chords by the use of technical aids. DE-AS 25 38 366 discloses that a chord be assigned to each of the keys provided. By actuating a certain key, a corresponding shortening element which acts on the string is actuated via a fluid conduit. Thereby, various shortening elements can be actuated in parallel, so that chords can thus be set. Owing to the multiplicity of chords which can be attained in this way, however, the additional technical means becomes more complicated, occupying a correspondingly large space on the neck of the instrument. But it is still possible only to actuate a limited number of chords, and no runs or single strikes.

In the device disclosed in DE-OS 19 63 306, six chords at the most can be set in one position. For other chords, the device must be moved along the neck. This is complicated and presupposes wide theoretical knowledge, and is not easy to learn, even for the trained player.

The playing aid disclosed by DE-OS 19 40 660 also occupies the major part of the neck and comprises a multiplicity of keys and Bowden cables by which the strings are shortened, the pressure on the keys corresponding to the pressure on the shortening elements. Thereby, the tuning of the guitar is modified from normal tuning to C, small octave—G, small octave—e flat$^1$—g—c—e flat.

The device disclosed by DE-AS 10 76 475 has electromagnetically controlled shortening elements. For each chord, there is a particular electric circuit which is closed by pressure on the corresponding key, whereby the corresponding shortening elements are activated and the desired chord is set. Chords in different positions may be selected via relays. The shortening elements are mounted along the entire length of the neck.

The known prior art devices only allow setting of a small number of chords and the variations thereof on the instrument, as compared to the great multiplicity of possibilities. With all the devices, certain variations simply cannot be made, e.g. major chords with sixths or ninths, which are particularly attractive.

A separate key is required for each chord or variation, which leads to troublesome and complex control elements.

The selection of chords is determined when the devices are manufactured; the user cannot set other chords without considerable technical effort.

With the mounted or built-in devices, there is no chance or only a limited chance for conventional playing.

Electronic means are known (DE-OS 29 02 606), which store entire musical numbers during playing, which can be called up from the memories for automatic control of a key instrument, in particular a bell or a chime. These electronic devices control the playing of the instrument. The musical numbers in the memory are played without further human intervention, like mechanical-automatic instruments, in response to an outside pulse, e.g. from the timer which is connected thereto.

SUMMARY OF THE INVENTION

With respect to the state of the art, it is the object of the invention to provide a string instrument including devices for setting chords or tone series, in which all the chords or tones possible within the range of shortening elements can be set rapidly on the instrument so that the playing hand can play them by plucking or hammering.

After application of the shortening and control elements, the instrument should remain manageable and it should be possible to play it conventionally. The control elements are intended to be simple and easy to handle.

In general, the solution of said problem resides in that an electronic device comprising one or more memories from which the chords or tones can be called up by control elements is provided, and the corresponding shortening elements are actuated by the signals generated.

The memories are interchangeable and can be programmed either from outside or by means of the instrument.

The control elements can be connected tightly with the instrument at some position which does not affect normal playing, or by means of a detachable accessory unit which may be readily connected with the other means mounted on the instrument in a simple manner so as to allow conventional playing when the control elements are removed.

An instrument can thus be used by a beginner in such a manner that the player can accompany even difficult songs and can play difficult sequences of chords after a few lessons and practice sessions. The advanced player can play series of chords without any effort as a solo performer or in a groups, and can combine them with fingered tones or chords in conventional performance. By pressing a button, the player can set in sequence the chords which are preset on the instrument, and an electronic display indicates what program, what chord number and what chord have been set. The new way of playing, optionally combined with conventional playing, may lead to compositions in all fields of music, e.g. modern, pop, classic, etc., as new styles of playing arise.

The invention can be used for all string instruments in which the pitch is determined by shortening the strings and on which chords are played.

Further details, characteristics and advantages of the invention are disclosed in the following description of preferred exemplary embodiments.

DESCRIPTION OF THE PREFERRED EMBODIMENTS

Figure 1:
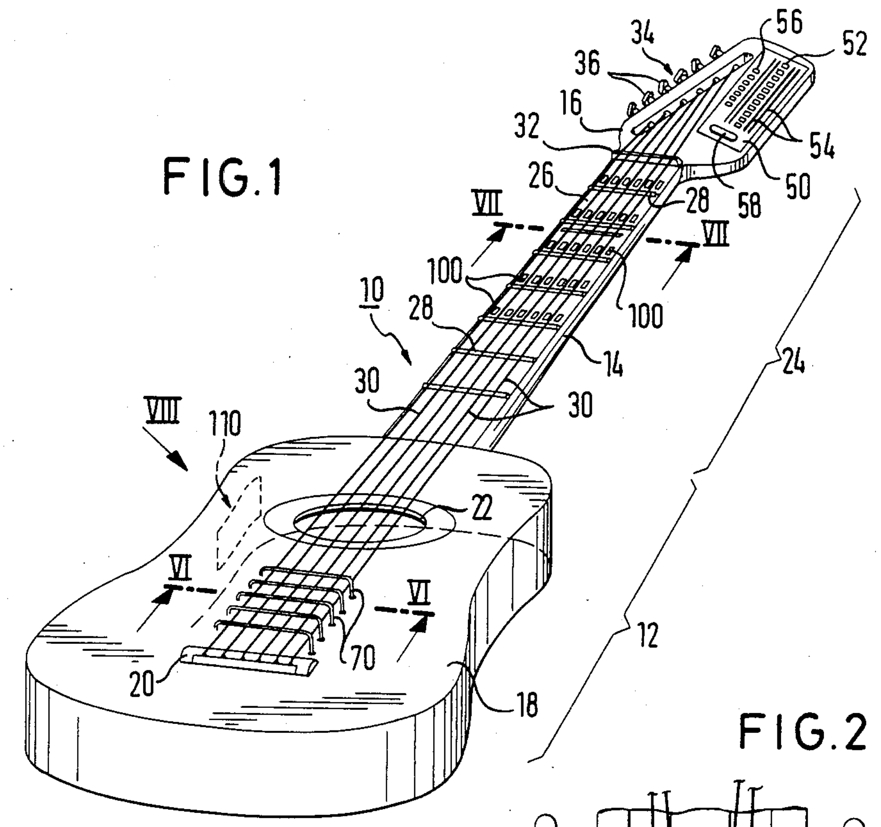
FIG. 1 shows a perspective schematic view of a string instrument in the shape of a guitar, FIG. 2, an enlarged cutout view of the neck portion and the fingerboard, FIG. 2*a*, a cross section along line II*a*—II*a*of FIG. 2, FIG. 3, a schematic perspective representation of a modified embodiment which can be mounted on the neck of a guitar, FIG. 4, a schematic longitudinal cross section through a neck portion, FIG. 5, a transverse cross section along line V—V of FIG. 4, FIG. 6, a transverse cross section of a modified embodiment along line VI—VI of FIG. 1.

FIG. 1 shows a schematic perspective of guitar 10. Said guitar 10, as usual, consists of resonant body 12 and fingerboard 24. Fingerboard 24 is on neck 14, which terminates in head 16 on which there is the known mechanism 34 for tuning the instrument. In a first embodiment, guitar 10 has shortening elements 70 for the simple setting of chords. Said elements are on and in the belly 18 adjacent to bridge 20 near a conventional sound hole 22. The embodiment of FIG. 1 also shows a modification according to which covering plate 50 is mounted on head 16 of guitar 10. For this, mechanism 34 is mounted beyond saddle 32 in a known manner such that the usual tuning pegs 36 for tuning strings 30 are located only on one side of head 16. On the opposite side of head 16, space has been made available for control elements 52 to 58 on covering plate 50. Strings 30 can be run alongside or beneath covering plate 50 to mechanism 34.

Chords stored in electronic memories 90 are called up by actuating control elements 52 to 58 on covering plate 50. Dependent on the actuation of control elements 52 to 58, pulses are given off from electronic memory 90 (FIG. 4) to the corresponding shortening elements 70 to 78 which change the length of the respective string 30 so that the desired chord can be played by the person playing guitar 10.

To improve the tonal quality, known pickups for amplifiers can be added.

Figure 2:
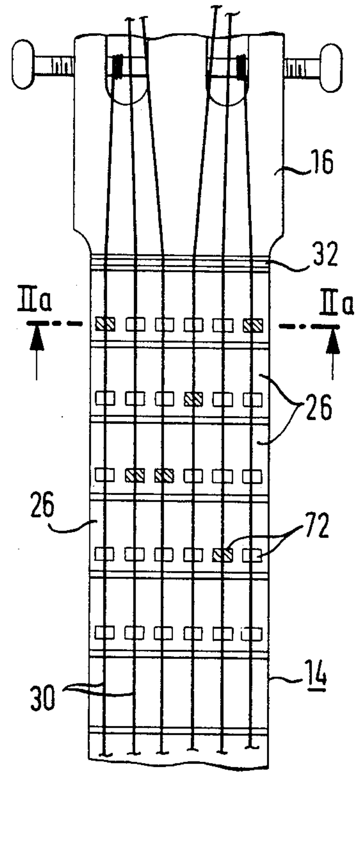
Figure 2A:
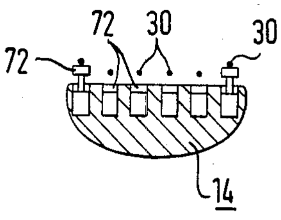

Besides this added device, which will be described in detail hereinafter, and which facilitates the learning and the playing of the guitar, guitar 10 can also be played in the conventional way in all of the shown embodiments. In the example of FIGS. 1, 2 and 2*a*, this may be done without further modification of guitar 10. Guitar 10 is fitted with the usual frets 26 and fret wires 28.

The instrument may be programmed during conventional playing. The chords fingered by a trained player in the conventional manner are picked up with respect to finger positions on corresponding strip beneath the strings 30, by sensors 100, mounted in fingerboard 24, and optionally combined with shortening elements, and are fed with the chords or chord series to electronic memory 90.

Figure 6:
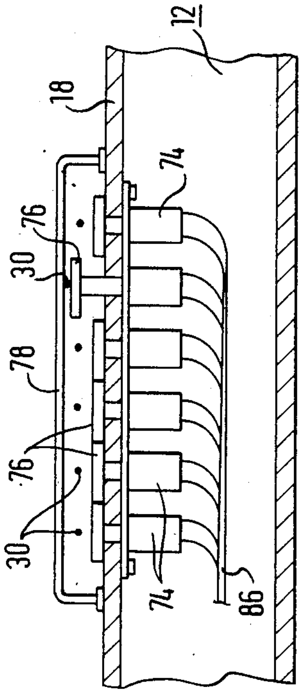

While the operations of shortening elements 70, merely indicated in FIG. 1, as shown in greater detail in an embodiment in FIG. 6, the automatic playing system is to be described on the basis of the embodiment shown in FIGS. 2 and 2*a*. Finger plates 72 are mounted flush in neck 14 and fingerboard 24 in frets 26 for each string 30; said plates 72 move upward through action of a pulse released by control elements 52 to 58 and electronic means 90, and any mechanical, electrical, hydraulic, pneumatic or electromagnetic means whatsoever may be used for this, as desired. The essential features is that string 30 can be acted on by finger plate 72 instead of by the human finger. String 30 can be pressed by finger plate 72 from below, whereby string 30 is shortened and will make a sound at the desired pitch. For each string 30 and fret 26, one finger plate 72 is movable upward, and the corresponding chords are formed in accordance with the preset adjustment. In FIG. 2, the hatched finger plates 72 are actuated, sounding chord F 7.

Figure 3:
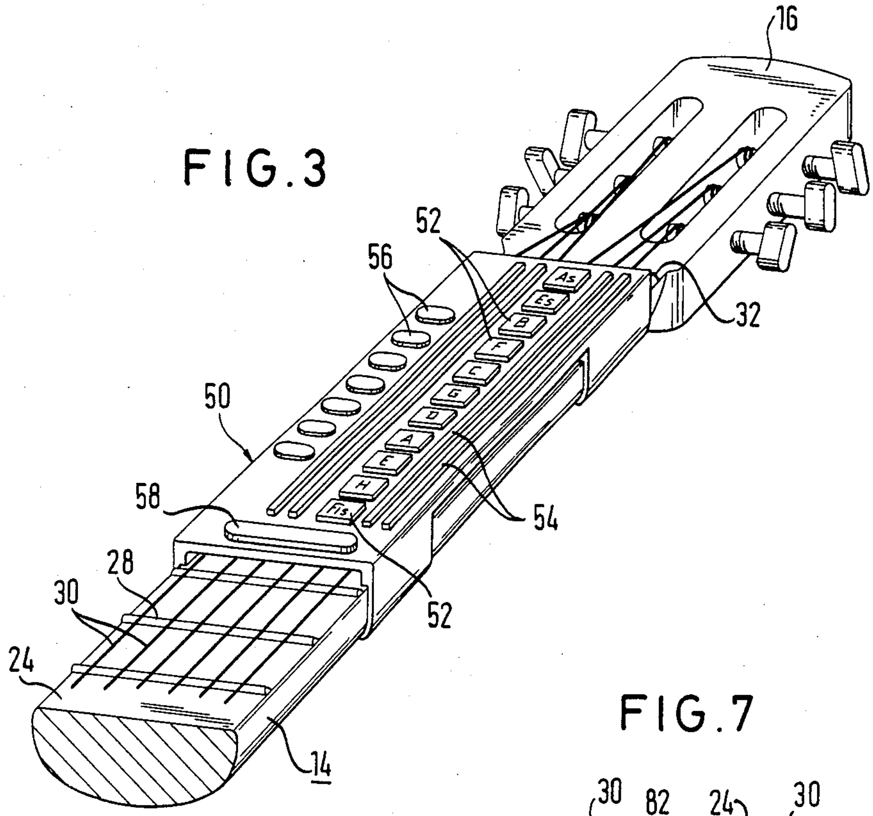

In FIG. 3, covering plate 50, mounted according to the invention, can be explained in greater detail. It carries the control elements for automatic playing. The description of the control elements also applies to the arrangement of covering plate 50 in FIG. 1.

In the embodiment of FIG. 3, covering plate 50 is mounted on top of neck 14, fingerboard 24 and strings 30, and is snapped onto the sides of neck 14 so as not to touch fingerboard 24 and strings 30.

On the top side of covering plate 50 are found control elements 52 to 58 for the chord selection. Buttons 52 are provided for direct call-up of the major chords. The designations of the chords are indicated on buttons 52 in the drawing. Thus, "A" means that the A major chord is being played. The indicated basic chord is set by pressing buttons 52, and can be played for a suitable interval.

The different variations of the chords are made by also touching strips 54 to minor chords or to sevenths, sixths, diminished chords etc. A strips 54 may also be built in for half-tones. The control elements may be extended or supplemented, dependent on the capacity of the automatic system. They may be replaced or supplemented by pedals.

Also, buttons 56 are provided, by which the basic tuning may be changed. When no button 52 and no batten 54 is pressed, C major is set.

After actuation of a switch connected to button 56, the chords can be reprogrammed or newly programmed. Said programming is stored in memory 90 which may be a PROM and may be turned on or off by button 56. A display means (FIG. 8) shows whether and how electronic memory 90 has been newly- or re-programmed. If for instance a suitable resetting has been executed, a button 52 "B major" can be re-programmed to a "C major" ninth with sharp fifth.

Automatic playing may even be enhanced by means of an additional button 58. A chord series can be stored, and said series can be called up by pressing additional button 58. The chord series and the chords are selected by buttons 56. Displays (FIG. 8) show the player the exact selection and the setting of the chord series and the chords on the additional button 58.

The covering plate 50 of FIG. 3 can be removed and replaced e.g. by a covering plate 50 configured differently as regards the control elements. Without covering plate 50, instrument 10 can be played in the conventional manner.

Figure 4:
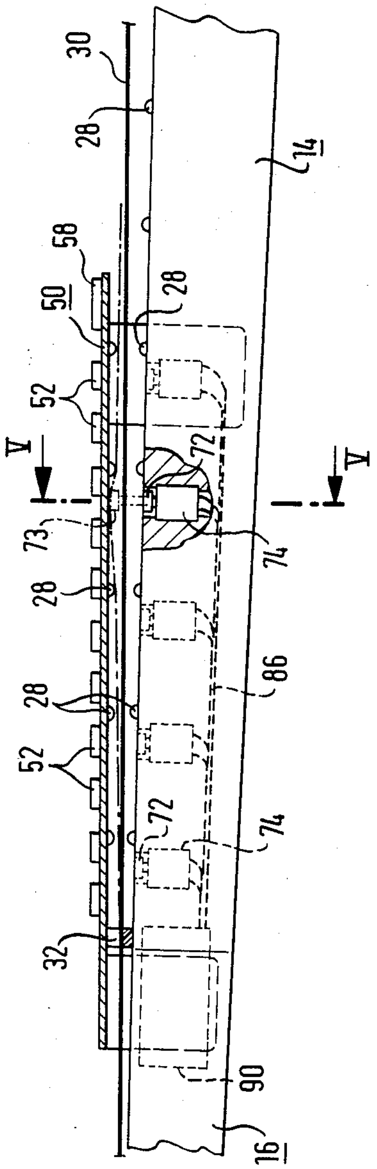
Figure 5:
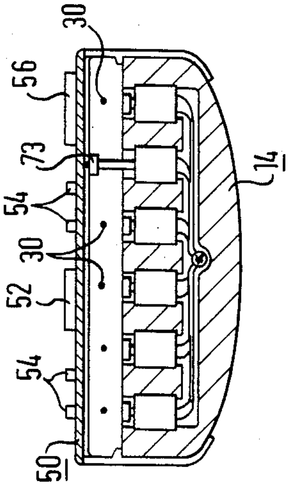

Supplementing FIG. 3, FIGS. 4 and 5 show how strings 30 are set to the desired pitch by the automatic system. Beneath covering plate 50 are the fret wires 28 for the pitch of strings 30. In neck 14 is a means 74 which presses finger plates 72 up when it receives an appropriate pulse from electronic memory 90. Such finger plate 73 is shown which presses string 30 against the underside of covering plate 50, so that the strings shown in broken line in FIG. 4 are supported on additional fret wires 28 arranged on the underside of covering plate 50, and take the pitch level determined by fret wire 28.

The drawing illustrates how, by actuation of one of the means, namely the fourth means, finger plate 73, string 30 is pressed upward, owing to which string 30 lies on the fourth fret wire 28 of covering plate 50, and therefore is raised by four half tones. If this is done to the A string, tone C sharp is set.

If for exceptional reasons a string 30 is not to sound because there is no suitable tone within the reach of the shortening elements, the corresponding string 30 is touched by the only half-raised finger plate 72, by which the string can be silenced, i.e. rendered mute. This action may be programmed, as well, and be stored in electronic memory 90.

In the schematic cross section through the neck and fingerboard 24 of FIG. 5, the first four finger plates and the sixth are in the basic position; the fifth finger plate 73 is raised so that the pitch of said string 30 is modified.

From memory 90, shown at the left in FIG. 4, lines 86 lead to actuation means 74. These means are firmly embedded in neck 14. The lines leading from memory 90 to buttons 52 to 56 have been left out, and they can be run via a disconnectable contact in those parts which clamp covering plate 50 on neck 14.

FIG. 6 is a cross section of another variant of the shortening elements which are built into belly 18 either at neck 14 or at bridge 20 (FIG. 1). Fret wires 28 can be mounted on belly 18, under strings 30 between bridge 20 and sound hole 22. Said fret wires 28 are divided into six parts 76, one part 76 for each string 30. Opposite each part 76 of the fret wires and above strings 30, there is a bar 78 extending parallel and fixed laterially to belly 18. Triggered by the electronic system, the parts of fret wires 76 are moved up by means 74, and shorten the respective string 30.

The shortening elements may generally be modified or formed so as to press or draw the string, no matter where they are placed on the string instrument. This is why the shortening elements can be drawn from above or also from below by means of a small mechanism. In keeping with this, the example of "pressing", as illustrated by the description, is not to be understood in a restrictive or limiting sense.

In FIG. 6, the first four parts of fret wires 76 are in the basic position. The fifth part 76 acts as a shortener of the corresponding string 30, so that string 30 is pressed against the underside of bar 78. The coating of part of fret wire 76 prevents string 30 from slipping off.

Figure 7:
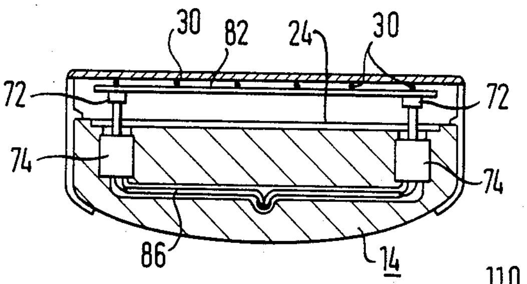
FIG. 7, a transverse cross section through the neck along line VII—VII of FIG. 1, and FIG. 8, a schematic representation of a display means which is within the player's vision along line VIII of FIG. 1.

In FIG. 7, at the end of covering plate 50 in and above neck 14, or after the last bar 78 on belly 18, near sound hole 22, or on belly 18 near bridge 20, a muting device is mounted, particularly for rhythm effects.

Two means 74 are built in for moving two finger plates 72 which are connected by bar 82. When the two finger plates 72 move up, strings 30 are touched and are thereby muted. On muting bar 82 is applied a coating which prevents vibration of string 30. Said muting means can be actuated immediately upon release of the control elements 52 to 58 or with an adjustable delay or by means of a special button 56 or a pedal not shown.

Figure 8:
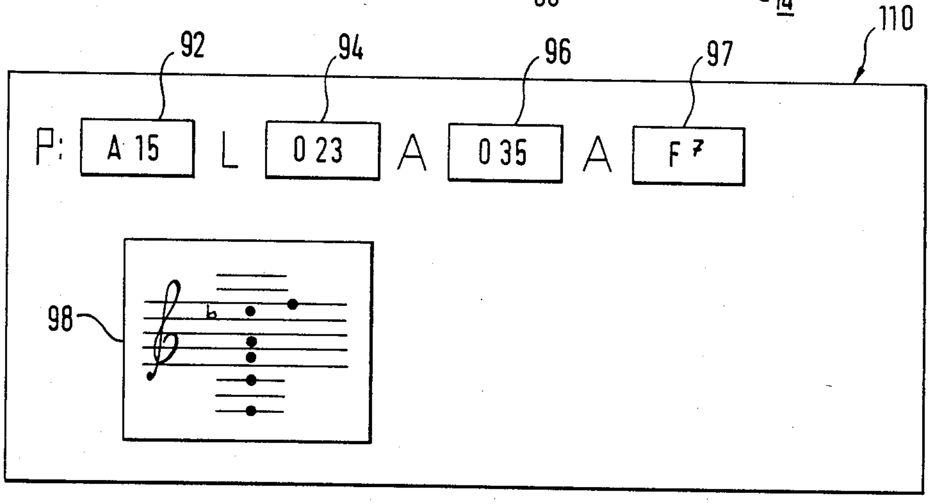

FIG. 8 is a line drawing of display field 110 which lies within the player's vision according to FIG. 1. It may also be mounted in any different manner whatsoever, on head 16, neck 14 or resonant body 12, or separately from guitar 10. In field 110, the player sees an indication of chord 97, a program or chip number 92, a musical or song number 94, a chord number 96 and a music picture 98 of the chord just played. The musical notation of F 7 is shown in field 98.

I claim:

1. An apparatus for effectively shortening the effective vibratory length of the strings of a fretted string instrument such as a guitar, including plate means moveable from a retracted inoperative position into contact with a selected string to press thereagainst to achieve shortening, actuating means for causing movement of said plate means, electronic memory means operably connected to said actuating means for storing musical chord string length information, and a plurality of user operable control switch means electrically connected to said memory means for user selection of desired chords or tones, whereby selection and operation of a desired control switch means will result in generation by said memory means of the signal necessary to achieve the proper string length for the selected chord to operate the proper actuating means and associated plate means.

2. An apparatus as defined in claim 1, wherein the memory means is programmable.

3. An apparatus as defined in either of claims 1 or 2, wherein said control switch means are formed integrally within the body of the instrument.

4. An apparatus as defined in either of claims 1 or 2, wherein said control switch means are mounted on a separate frame which may be attached directly to the instrument.

5. An apparatus is defined in claim 4, wherein the separate frame includes means thereon for releasably securing the same to the neck of an instrument.

6. An apparatus as defined in claim 3, wherein said plate means are normally mounted within the fret board of the instrument.

7. An apparatus as defined in claim 3, wherein said instrument includes a bridge member on the body thereof, and said plate means are mounted adjacent thereto.

8. An apparatus as defined in claim 1, and further including muting means under control of said memory means and said control switch means for silencing one or more of the strings.

9. An apparatus as defined in claim 1 and further including a fingerboard on the instrument below the strings and sensor means mounted on the fingerboard and electrically connected to said memory means and adapted to sense movement of the strings thereagainst by the fingers of the player to program the memory means for later use in duplicating a chord or tune.

10. An apparatus as defined in claim 1 and further including a display panel electrically connected to said control switch means and said memory means to provide a visual indication of the chord being played.

* * * * *